April 13, 1943.    E. C. RANEY    2,316,619
CONTROL SYSTEM
Filed Aug. 21, 1941
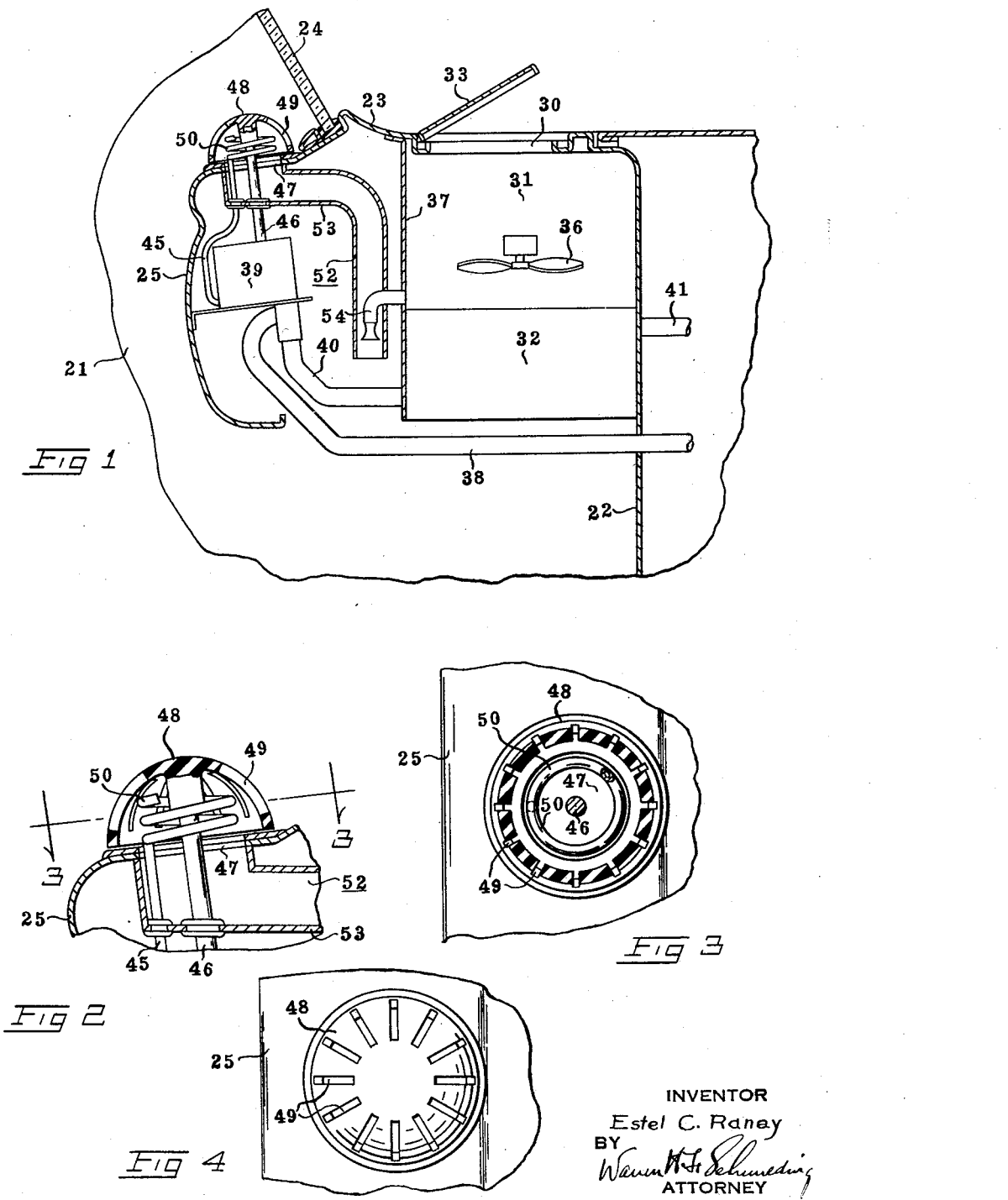

Patented Apr. 13, 1943

2,316,619

UNITED STATES PATENT OFFICE 2,316,619

CONTROL SYSTEM

Estel C. Raney, Columbus, Ohio, assignor to Ranco Incorporated, Columbus, Ohio, a corporation of Ohio Application August 21, 1941, Serial No. 407,807

5 Claims. (Cl. 237—2)

The present invention relates to a temperature control system, and more particularly to mechanism for causing a positive flow of a medium over a thermal responsive element of a control apparatus, which apparatus controls the temperature of the medium.

The temperature of the interior of the passenger compartment of automobiles are sometimes controlled by forcibly directing air from outside the compartment, through a heat exchanger, such as a radiator type heater, and into the compartment, and controlling the temperature of the heat exchanger automatically by a control apparatus having a thermal responsive element subjected to the temperature of the air in the compartment. It is difficult to place the thermal responsive element in a position to be responsive to the average temperature of the air in the compartment and also, the normal circulation of air over the thermal element is not sufficiently rapid to cause the temperature of the thermal element to vary readily with changes in temperature in the compartment. This results in uncomfortable fluctuations in temperature. It is an object of this invention to provide mechanism for causing passenger compartment air to be positively and rapidly circulated over the thermal responsive element of the control apparatus so that the temperature of the thermal element is closely responsive to the average temperature of the air in the compartment.

In carrying out the above object, it is the object of the invention to provide an aspirator for drawing a stream of air from inside the compartment over the thermal element, and to operate the aspirator by causing a portion of the air being forcibly directed into the compartment to be discharged through an ejector of the aspirator where it entrains air in the aspirator.

Another object of the invention is to provide a rotatable member for adjusting the control apparatus, which rotatable member comprises a hollow shell that incloses the thermal responsive element and which is formed having one or more openings which provide one or more finger grips for rotating the member. The interior of the hollow shell is in communication with air circulating means such as an aspirator, so that air from inside the compartment is drawn through the opening in the shell and over the thermal responsive element.

Other objects and advantages will be apparent from the following description, reference being had to the accompanying drawing wherein a preferred form of embodiment of the present invention is clearly shown.

In the drawing:

Fig. 1 is a fragmentary view, in section, of the forward end of the passenger compartment of an automobile and a temperature control system for the passenger compartment;

Fig. 2 is a fragmentary view, in section and on a larger scale, of the adjusting member and thermal responsive element of the control apparatus shown in Fig. 1;

Fig. 3 is a view in section taken on line 3—3 of Fig. 2; and,

Fig. 4 is a top view of the adjusting member for the control apparatus.

Although the invention may be embodied in various forms of construction, for the purpose of illustrating a preferred form thereof, I have shown a fragment of the forward end of a closable passenger compartment 21 of the usual sedan type of automobile. The compartment includes a forward wall 22, cowl 23 and a windshield 24. An instrument panel is shown at 25, and it extends transversely of the compartment beneath the wind shield 24, as is usual.

The temperature inside the passenger compartment is controlled, in relatively cool weather, by directing air from outside the compartment through an opening 30 formed in the cowl 23, downwardly through a duct 31, through a suitable hot water type radiator heater 32 and into the compartment 21. Air is directed into the duct 31, when the automobile is in forward motion, by the tiltable cover 33, which cover deflects air downwardly into the duct 31. When the automobile is moving approximately at or above fifteen miles per hour, sufficient air will be forced through the duct to cause a pressure slightly above surrounding air pressure. Due to the fact that air leaks out of the compartment about the doors and windows, etc., the flow of air to the compartment is continuous. The cover 33 may be closed over the opening 30, when desired, by suitable, standard mechanism not shown. When the automobile is stationary, or is moving slowly, air may be forced into the compartment through the duct 31 by an electric motor driven fan 36. The duct 31 is formed by wall 22 and by a channel shaped hood 37 which is attached to the cowl 23, the open side of the hood facing the wall 22 so that the latter wall forms one wall of the duct.

The heater 32 is of the conventional hot water type in which hot water from the automobile engine is directed through a plurality of tubes extending transversely of the heater and which tubes are provided with fins so that air passing over the fins and between the tubes readily absorb heat from the tubes. Since these types of heaters are well known, the heater 32 is shown diagrammatically. Hot water from the engine block is directed to the heater through a tube 38, control valve 39 and tube 40 to the inlet of the heater. Water discharged from the heater is returned to the cooling system of the engine through a tube 41. It is to be understood that the cooling system for the engine is provided with the usual thermostatically controlled valve between the engine and radiator which valve controls the flow of water between the engine and radiator for maintaining the temperature of the water above the engine substantially constant.

The control valve mechanism 39 is similar to that shown in my copending application Serial Number 370,906, filed December 19, 1940, and it comprises in general, a valve that is opened and closed by a diaphragm, which diaphragm is connected with a tube 45, and the tube and diaphragm contains a volatile fluid, which fluid is in the form of a vapor at normal operating temperatures of the control valve. The tube 45 is extended into the passenger compartment and is responsive to air temperatures in the compartment. The vapor pressure in the tube 45 varies in accordance with variation in temperature of the tube, thereby causing the valve to increase and decrease the flow of liquid to the heater 32 for maintaining the air in the compartment at the temperature desired. The temperatures at which the valve is operated is controlled by a spring that opposes extension of the diaphragm, and this spring, when adjusted, varies the pressures and consequently the temperatures at which the valve will be operated by the diaphragm. The tension of the spring is adjusted by a screw mechanism, and this mechanism may be rotated for adjusting the spring by a rod 46 that extends upwardly from the control valve mechanism 39 through an opening 47 in the instrument panel 25. The shaft 46 is rotated manually by a knob 48 that is attached to the end thereof. Knob 48 comprises a hollow, semi-spherical shell, which shell is provided with a plurality of slots 49. Preferably, the slots 49 are of such length and width as to afford finger grips to facilitate manual manipulation of the knob.

The tube 45, is extended upwardly through the opening 47 in the instrument panel 25 and is coiled about the shaft 46 as at 50, the coil being within the confines of the hollow knob 48. The coil 50 is sujected to a cooler air temperature than the portion of the tube 45 intermediate the coil and control valve, and for this reason I prefer to refer to the coiled portion of the tube as a thermal responsive element, since during normal operation of the control system the valve will be controlled according to the temperature of the coil.

In order to cause positive flow of air from inside the compartment over the coil 50, I have provided an aspirator mechanism indicated generally at 52. The aspirator mechanism comprises a conduit 53 having one end connected to the underside of the panel 25 and in registration with the opening 47 in the instrument panel, and the opposite end of the conduit extends downwardly alongside the wall 37 of the duct 31. The conduit 53 may be formed of any suitable material, for example, sheet metal. A downwardly projecting tube 54 is extended through a wall of the lower end of conduit 53. The lower end of the tube 54 includes a restricted portion and a flare; and the opposite or upper end of the tube 54 extends through an opening in the wall 37 of the duct 31 for receiving air from the duct.

When air is forced into the duct 31, either by operation of the fan 36 or by forward movement of the automobile, the pressure in the duct will be greater than the pressure in the interior of the compartment, due to the fact that there are numerous air leaks in the usual passenger compartment. This differential in pressures causes air to be directed through the tube 54 and discharged therefrom into the conduit 53 in the direction of the outlet of the latter. The restricted portion of the tube 54 causes the air to be discharged from the tube 54 at a relatively high velocity and this air entrains the air in the conduit 53, thus causing air from the interior of the compartment to be drawn through the openings 49 in the knob 48, over the thermal element 50 and through the conduit 53. The amount of air discharged through the tube 54 will not appreciably affect the temperature of the air in the compartment since the volume thereof is small compared with the volume of air passing through the heater 32 and into the compartment.

It is apparent that by my invention, a positive flow of air is caused to be passed over the thermal element of the control valve so that the thermal element is closely responsive to the average or mean temperature within the compartment. This positive flow of air is insured in a simple manner by the aspirator that utilizes a portion of the air, being directed into the passenger compartment for conditioning purposes, to provide the impetus for the aspirator.

By forming the adjusting knob 48 in the manner described, the knob serves the purpose of forming a shield for the thermal element and also provides an easily manipulated knob.

It is to be understood that the term "aspirator" as used herein and in the claims may be any type mechanism for producing a flow of air by suction.

While the form of embodiment of the present invention as herein disclosed constitutes a preferred form, it is to be understood that other forms might be adopted, all coming within the scope of the claims which follow.

I claim:

1. In combination, a vehicle including a closable compartment; means forming a duct for conducting air from outside the compartment into the compartment; a heat exchanger associated with the duct for affecting the air passing through the duct; means for controlling the rate of heat exchange between said exchanger and air, the last mentioned means including a thermal responsive element; means for forcing air from outside the compartment through the duct and into the compartment; means forming a tube open at each end, one end of said tube communicating with the interior of the compartment; and means for directing air from said duct into the tube toward said opposite end thereof for entraining air in said tube from the compartment, said thermal element being disposed to be subjected to the temperature of the entrained air.

2. In combination, a compartment; means for controlling the temperature of the air in the compartment, said means including a thermal responsive element and an adjustable member; manually rotatable means in said compartment for adjusting said member, said rotatable means including a hollow rotatable shell, said shell being extended into the compartment for forming a manually rotatable knob, said shell having one or more air inlet openings therein, the portions of the shell at said opening or openings forming one or more finger grips, said thermal element being disposed within the shell; and means forming an aspirator for drawing air from the compartment, through said opening or openings in the shell and over the thermal element.

3. In combination, a compartment; means for controlling the temperature of the air in the compartment, said means including a thermal responsive element and an adjustable member; manually rotatable means in said compartment for adjusting said member, said rotatable means including a hollow, rotatable shell, said shell being extended into the compartment for forming a manually rotatable knob, said shell having one or more air inlet openings therein, said thermal element being disposed within the shell; and means for causing a positive circulation of air from the compartment through the opening or openings and over the thermal element.

4. In combination, a vehicle including a closable compartment; means forming a duct for conducting air from outside the compartment into the compartment; a heat exchanger associated with the duct for affecting the air passing through the duct; means for controlling the rate of heat exchange between said exchanger and air, the last mentioned means including a thermal responsive element; means for forcing air from outside the compartment through the duct and into the compartment; and means forming an aspirator comprising a gas ejector and a conduit for directing gas about the outlet of the ejector, said ejector being connected with said duct for causing air to be forced from the duct through the ejector, said conduit being opened at each end and having one end communicating with the interior of the compartment for directing air to said ejector to be entrained by air discharging from said ejector, said thermal element being disposed in the path of air drawn from the compartment into the conduit.

5. In combination, a vehicle including a closable compartment; a heat exchanger associated with the compartment for affecting the temperature in the compartment; a control mechanism for regulating the effect of the heat exchanger including, a thermal element; means forming a tube open at each end, one end of said tube communicating with the interior of the compartment; and means for directing air from outside the compartment into said tube and toward the end opposite said one end for entraining air in said tube from the compartment, the last mentioned means being effective to force air into said tube at pressures proportional to the speed of the vehicle, said thermal element being disposed to be subjected to the temperature of the air entrained in said tube.

ESTEL C. RANEY.